Jan. 17, 1967 D. E. ELSON 3,298,409
RETAINING MEMBER
Filed May 22, 1964 2 Sheets-Sheet 1
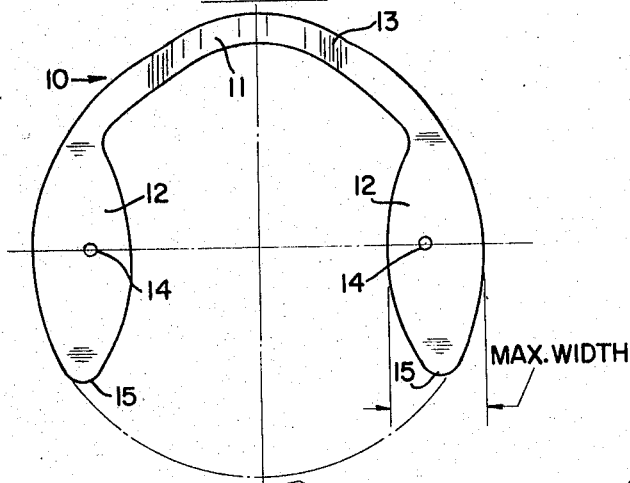
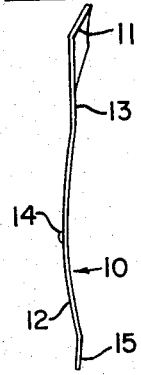
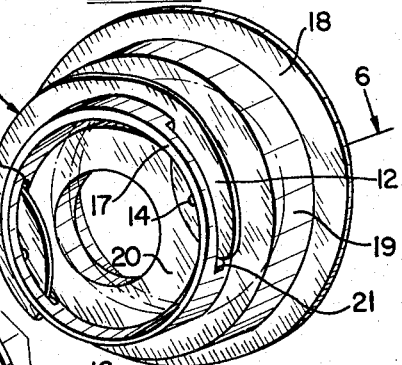
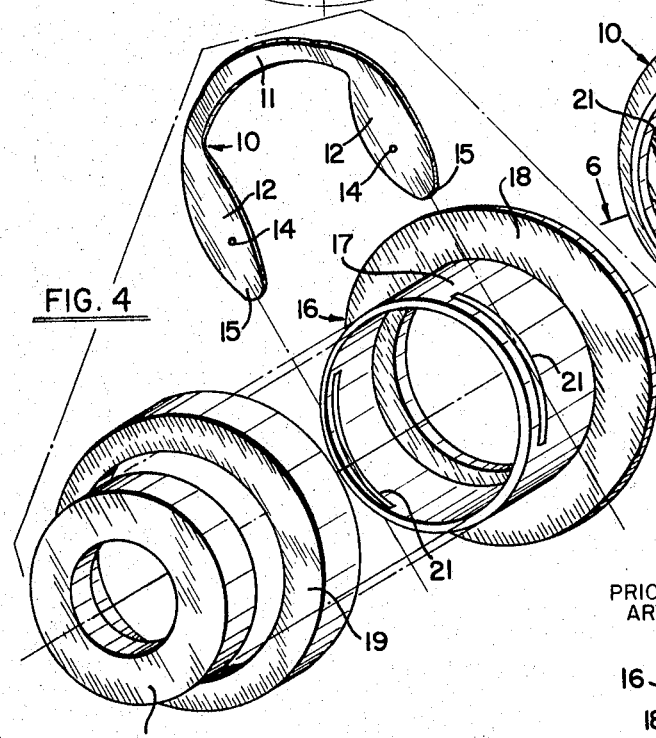
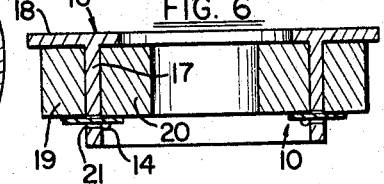
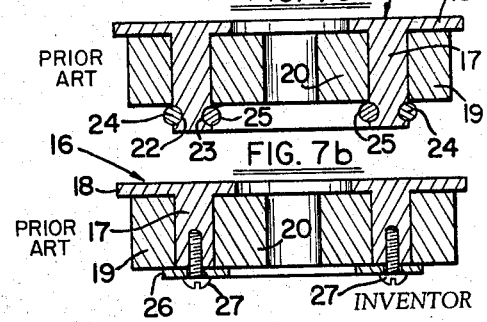
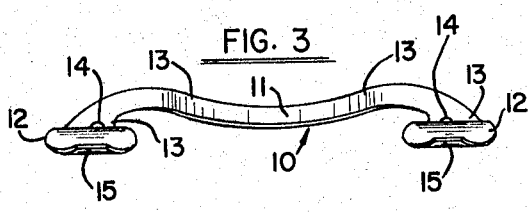
INVENTOR
DONALD E. ELSON
BY Leonard Bloom
ATTORNEY Jan. 17, 1967     D. E. ELSON     3,298,409
RETAINING MEMBER
Filed May 22, 1964     2 Sheets-Sheet 2
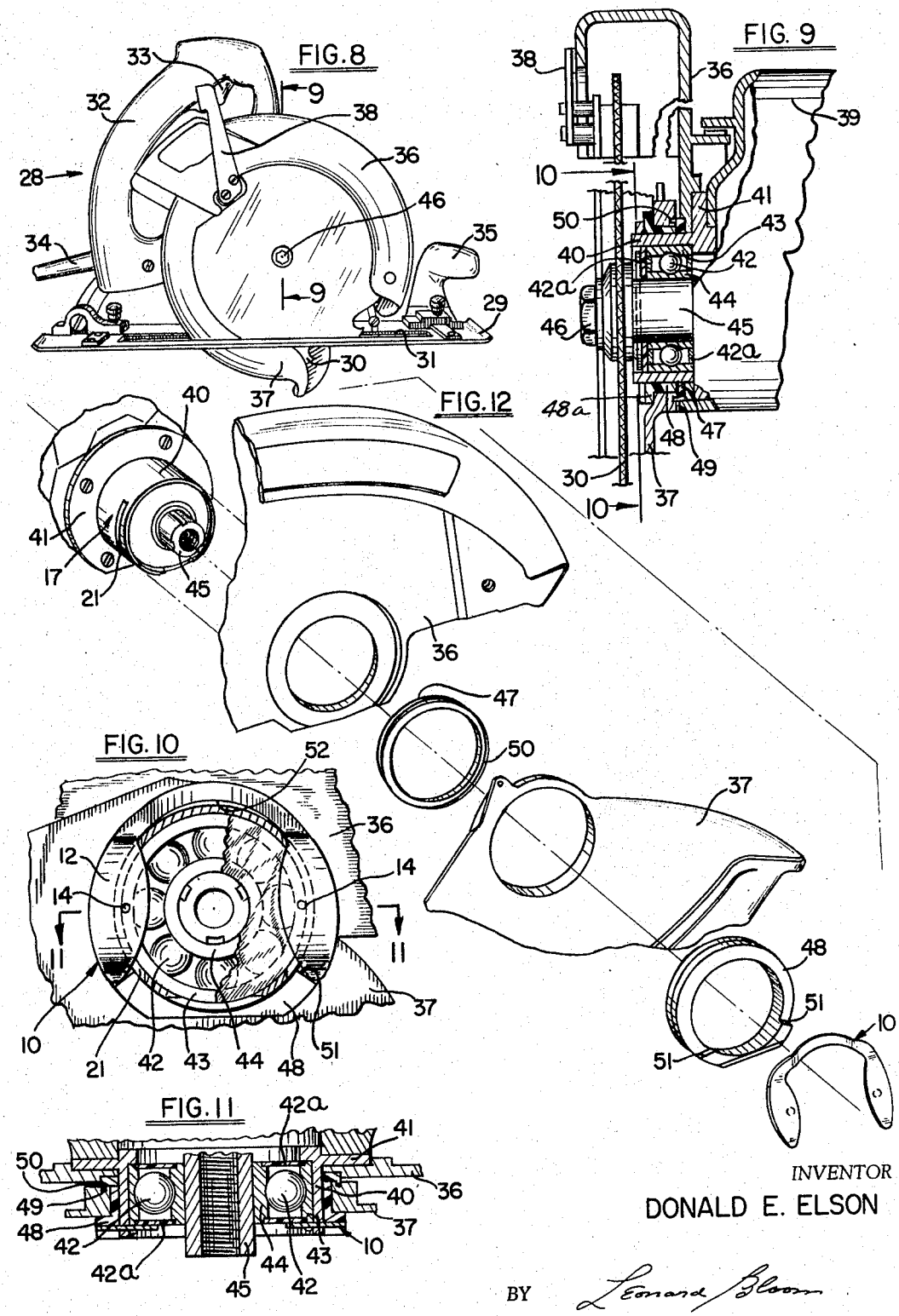
INVENTOR
DONALD E. ELSON
BY *Leonard Bloom*
ATTORNEY United States Patent Office 3,298,409
Patented Jan. 17, 1967

3,298,409
RETAINING MEMBER
Donald E. Elson, Baltimore, Md., assignor to The Black and Decker Manufacturing Company, Towson, Md., a corporation of Maryland
Filed May 22, 1964, Ser. No. 369,421
12 Claims. (Cl. 143—159)

The present invention relates to a retaining member, and more particularly, to a single member for simultaneously retaining a pair of members, one external and one internal, upon a walled supporting member.

In accordance with the broad teachings of the present invention, a single means is herein illustrated and described for retaining both members upon the supporting member, and more specifically, for preventing any substantial movement of the members in at least one direction axially of the supporting member. This improved means comprises a retaining member which is mounted upon the supporting member and is positioned axially adjacent to the external member, thereby retaining the external member on the supporting member. At least one opening is formed in the wall of the supporting member, and the retaining member has a portion which projects through the opening (inwardly of the supporting member) and is positioned axially adjacent to the internal member, thereby simultaneously retaining the internal member within the supporting member.

Preferably, but not necessarily, the supporting member comprises a machine hub formed as a relatively thin-walled sleeve; the internal member comprises a bearing received within the hub, the bearing journaling an arbor which drives a saw blade or suitable tool element; and the external member comprises a guard for the blade, the guard being mounted upon the hub.

In accordance with the further teachings of the present invention, the hub has a pair of slotted openings formed therein diametrically opposite to one another; and the retaining member comprises a bifurcated substantially U-shaped member having a pair of legs received in the respective slotted openings formed in the hub, thereby mounting the retaining member on the hub. The retaining member prevents the guard from moving axially off the hub, and the respective legs of the retaining member project inwardly of the hub for simultaneously retaining the bearing within the hub.

Additionally, the retaining member comprises a substantially-flat piece, preferably metallic, which is formed (in side elevation) with a series of "waves" or undulations, thereby providing the retaining member with a degree of inherent resiliency, such that the guard and bearing are constantly urged against their respective shoulders formed on the hub.

Preferably, each of the leg portions of the retaining member is flanged or enlarged (in plan outline) radially inwardly of the member, such that the width of each leg is at a maximum intermediate the length thereof, and such that the point of maximum width lies substantially on a diametral axis of the generally-annular split retaining member. A raised dimple is formed on each of the respective legs of the retaining member, approximately at the point of maximum width and within the radially-enlarged portion of the leg; and the function of the raised dimples is to cooperate with the respective slotted openings formed in the walled supporting hub, so as to provide a detent "snap action" for mounting the retaining member upon the hub. Moreover, each of the legs of the retaining member terminates in a respective integral toe portion which is curved (in side elevation) in relation to its respective leg; and the toes cooperate with respective lands formed on a bushing mounted upon the hub, thereby preventing a rotation of the bushing about the axis of the hub.

A specific application of the retaining member of the present invention is also disclosed herein, and this specific application involves a portable electric saw which is provided with a housing having a hub formed as a relatively thin-walled cylindrical sleeve. A ball bearing is provided, having an inner race and an outer race, and the outer race of the bearing is slidably received (concentrically) within the hub. An arbor is journaled in the inner face of the bearing, and a saw blade is mounted on the end of the arbor. An upper guard is provided for the blade, along with a lower guard which telescopes within the upper guard upon engagement with the work in the usual manner. Preferably, the upper guard is rotatably mounted upon the hub, while the lower guard is freely mounted, preferably, upon a bushing mounted on the hub. A pair of diametrically opposed slots is formed in the hub, forwardly of the lower guard, and the respective legs of the substantially U-shaped resilient retaining member are received in these slots, thereby mounting the retaining member upon the hub. Each of the legs of the retaining member projects through its respective slot (inwardly of the hub) and is lodged against the forward edge of the outer race of the ball bearing. Consequently, the single retaining member serves a plurality of functions: One, it prevents the bushing and the lower guard from coming off the hub; two, it resiliently loads the rotatably mounted upper guard against a suitable shoulder formed on the hub; and three, it simultaneously retains the outer race of the bearing within the hub. Additionally, the retaining member has a pair of respective toes which seat upon spaced lands formed on the bushing, thereby preventing a rotation of the bushing on the hub.

The inherent utility of the retaining member, and the varied and numerous functions simultaneously performed by it, especially the dual retention of a guard member on the hub and a bearing member within the hub, distinguishes it from the prior art structural combinations, wherein two separate retaining members, generally in the form of split retaining rings, are required, one for the guard or other external member, and the other for the bearing or other internal member; a separate annular groove is formed in the hub for each ring, one groove being external and the other internal, and thus the cylindrical wall of the hub must be relatively thick to accommodate the respective grooves. On the other hand, the present invention not only achieves an ease of assembly and a resultant economy of manufacture; but also, it has the decided structural advantage of facilitating a relatively thin-walled hub, and accordingly, a relatively large-diameter bearing, thereby providing a better support for the arbor in a given space limitation.

These and other objects of the present invention will become apparent from a reading of the following specification, taken in conjunction with the enclosed drawings, in which:

FIGURE 1 is a top plan view of the retaining member of the present invention;

FIGURE 2 is a side elevation thereof;

FIGURE 3 is a front elevation thereof;

FIGURE 4 is an exploded perspective view of the walled supporting hub, the external member to be mounted on the hub, the internal member to be received within the hub, and the retaining member of the present invention;

FIGURE 5 shows the members of FIGURE 4 in assembled relationship;

FIGURE 6 is a transverse section view taken along the lines 6—6 of FIGURE 5;

FIGURES 7a and 7b are section views exemplifying the retaining means employed in the prior art;

FIGURE 8 is a side elevation of a portable electric saw in which a particular application is made of the retaining member of the present invention;

FIGURE 9 is a section view taken along the lines 9—9 of FIGURE 8, enlarged over the scale of FIGURE 8, and showing the retaining member mounted upon the relatively thin-walled hub of the saw to retain the guard member (and related components) on the hub;

FIGURE 10 is a section view, taken along the lines 10—10 of FIGURE 9, showing the manner in which the flanged leg portions of the retaining member project through the respective slots formed in the hub to simultaneously retain the outer race of the ball bearing within the hub;

FIGURE 11 is a transverse section view, taken along the lines 11—11 of FIGURE 10, showing the multi-retention function which is performed by the resilient retaining member; and FIGURE 12 is an exploded perspective view of the components shown in assembled relationship in the preceding FIGURES 9-11.

With reference to FIGURES 1-3, the retaining member 10 of the present invention preferably comprises a generally-annular bifurcated split member, which is substantially U-shaped in plan outline, and has a body portion 11 and a pair of leg portions 12 depending therefrom. The retaining member is a substantially-flat metallic piece, but is preferably formed, see FIGURES 2 and 3, with a series of "waves" or undulations 13, thereby providing the retaining member with a degree of inherent resiliency. Each of the leg portions 12 of the retaining member is flanged or enlarged in plan outline, see FIGURE 1, radially inwardly of the retaining member, such that the width of each leg is at a maximum intermediately of the length of the leg, and such that the point of maximum width lies substantially on a diametral axis of the retaining member. A raised dimple 14 is formed on each of the respective legs, approximately at the point of maximum width, for a purpose hereinafter to be described. Each of the legs, moreover, terminates in a toe portion 15, which, see FIGURES 2 and 3, is curved in side elevation in realtion to its respective leg.

With reference to FIGURES 4-6, the function and operation of the retaining member of the present invention may be understood more clearly. A walled supporting member 16 is provided, which comprises a hub 17 (formed as a cylindrical sleeve) and an integral flange portion 18 serving as an annular shoulder. A first member 19 is positioned externally on the hub 17, while a second member 20 is positioned internally of the hub. A pair of diametrically opposed slotted openings 21 is formed in the hub, and the respective legs 12 of the retaining member are received within the slots 21. The legs 12 of the retaining member project radially inwardly of the hub 17, see FIGURES 5 and 6; and preferably, the dimples 14 lodge against the inner cylindrical surface of the hub (adjacent to the respective slots 21) so as to provide a detent "snap action" for removably mounting the retaining member upon the hub. The retaining member 10, in the particular combination of FIGURE 4, serves a dual function: first, it retains the external member 19 upon the hub 17; and secondly, it retains the internal member 20 within the hub. Moreover, it resiliently retains the members 19 and 20 against the shoulder 18.

The inherent advantage and utility of the retaining member of the present invention may be appreciated more readily by comparing it with some of the retaining means habitually resorted to in the prior art. In FIGURE 7a, the hub 17 has a relatively-thick wall section with a pair of annular grooves 22 and 23 formed therein, 22 external and 23 internal; and respective split resilient rings 24 and 25, in the nature of "snap" rings, are seated in the grooves. Ring 24 retains the external member 19 on the hub 17, while ring 25 retains the internal member 20 within the hub. Another prior art method is shown in FIGURE 7b. Here, the members are retained by means of a plate in the form of a washer 26 that is secured to the hub by means of screws 27. The internal member 20 may comprise a bearing for journaling an arbor, not shown, while the external member 19 may comprise a guard for a tool element driven by the arbor.

The structures shown in FIGURES 7a and 7b exemplify the prior art methods, which invariably require a relatively thick-walled supporting hub to structurally accommodate the required pair of annular grooves 22 and 23 of FIGURE 7a, or else to accommodate the required tapped recesses for the screws that mount the retaining washer 26 of FIGURE 7b; and as a result, three alternatives—neither of which is particularly desirable—must be elected. Either the diameter of the arbor must be reduced; or else the size, and hence the capacity, of the bearing must be reduced; or else the outer diameter of the supporting hub must be increased. As contradistinguished from this prior art dilemma, the present invention facilitates a structural arrangement featuring a relatively thin-walled hub, see FIGURE 6 again, with the result that the full diameter of the arbor may be journaled in a larger bearing having a proportionally greater capacity, yet the outer diameter of the hub is compatible with a given space limitation; and hence, the advantages of compactness, structural rigidity, and mechanical support are fully realized together with an ease of assembly and a resultant economy of manufacture.

A particular application of the retaining member of the present invention is illustrated in FIGURES 8-11. A portable electric saw 28 is shown in FIGURE 8, and it will be appreciated that the saw 28 is only one of many applications that may be found for the retaining member 10. With this in mind, the saw 28 generally comprises a substantially flat shoe plate 29 by means of which the saw may be supported upon the top surface of a workpiece, a blade 30 projecting through a slot 31 in the shoe to engage the work, a control handle 32 having a trigger switch 33 for energizing the unit from an electrical line cord 34, a front knob 35 to assist in manually guiding and controlling the unit, an upper guard 36 for the blade, a lower blade guard 37 adapted to telescope within the upper guard upon engagement with the work, and a lever 38 secured to the lower guard to facilitate its optional manual retraction.

The saw 28 further comprises, see FIGURE 9, a generally cylindrical housing which includes a suitable hub, similar to the hub 17 of FIGURE 4, and comprising a generally cylindrical sleeve 40 and an integral flanged portion forming an annular shoulder 41. A ball bearing 42 is positioned within the sleeve, and the bearing has respective seals 42a, an outer race 43, and an inner race 44. An arbor 45 is journaled within the inner race of the bearing, and the saw blade 30 is retained upon the arbor by means of a shoulder screw 46. Preferably, but not necessarily, the upper guard 36 for the blade is rotatably mounted upon the sleeve 40. A spacer collar 47, preferably molded from a suitable anti-friction material, is positioned on the sleeve forwardly of the upper guard 36. A guard bushing 48, also preferably molded of a suitable anti-friction material, is positioned on the sleeve forwardly of the spacer collar 47. The pivoted lower guard 31 is mounted upon the guard bushing 48; and preferably, the lower guard has an annular trepan 49, see FIGURE 9 again, to receive the annular peripheral rim 50 of the spacer collar 47. The retaining member 10 of the present invention is next fitted upon the sleeve 40 such that its legs 12 are received within the diametrically opposed slots 21 formed in the hub in a manner as previously described with reference to FIGURES 4-6.

Consequently, and in this particular application, the retaining member 10 resiliently retains the bushing 48, the spacer collar 47, and the upper guard 36 against the annular shoulder 41 formed on the sleeve 40 of the hub, and (in cooperation with the flanged portion 48a of the bushing) prevents the lower guard 37 from being removed from the hub; and moreover, the respective enlarged portions of the legs 12 project through the slots 21 (inwardly of the hub) to engage the annular edge of the outer race 43 of the bearing 42, see FIGURE 10, thereby simultaneously retaining the bearing within the hub. Preferably, the guard bushing 48 has a pair of lands 51, see FIGURE 11, and the respective toe portions 15 of the retaining member 10 are seated upon the lands, thereby preventing the bushing from rotating with respect to the hub.

Moreover, the retaining member is so dimensioned that, when seated on the hub as shown in FIGURE 10, a small arcuate space 52 is provided between the hub and the top body portion of the retaining member, such that a suitable tool, such as the blade of a screwdriver, may be inserted within the space 52 to facilitate the removal of the retaining member.

Obviously, many modifications may be made without departing from the basic spirit of the present invention; and accordingly, within the scope of the appended claims, the invention may be practiced other than has been specifically described herein.

I claim:

1. In a power-driven tool of the type having a hub, a bearing within the hub, an arbor journaled in the bearing, a tool element mounted on the arbor, a guard for the tool, and means mounting the guard on the hub, the improvement which comprises:
    (a) a member mounted upon the hub for retaining the guard and its mounting means against axial movement off the hub;
    (b) the hub having an opening formed therein; and
    (c) said member having a portion received through said opening for simultaneously retaining the bearing within the hub.

2. In a power-driven tool of the type having a hub formed as a sleeve, a bearing within the hub, an arbor journaled in the bearing, a tool element mounted on the arbor, a guard bushing mounted on the hub, and a guard on the bushing, the improvement which comprises:
    (a) a pair of diametrically opposed slots formed in the hub; and
    (b) a bifurcated retaining member having a pair of flanged leg portions received in said respective slots, thereby mounting said retaining member on the hub, and thereby retaining the guard and its bushing against axial movement off the hub;
    (c) said flanged leg portions of said retaining member projecting inwardly of the hub for simultaneously retaining the bearing within the hub.

3. The improvement described in claim 2, wherein:
    (a) said bifurcated retaining member is formed as a split wavy washer for resiliently urging the guard bushing against a shoulder formed on the hub, and simultaneously, for resiliently retaining the bearing within the hub.

4. The improvement described in claim 2, wherein:
    (a) the guard bushing is formed with a pair of circumferentially spaced lands projecting in an axial direction forwardly of the hub; and wherein:
    (b) said flanged leg portions of said retaining member have a pair of respective toe portions that are supported on said respective lands, thereby preventing the bushing from rotating on the hub.

5. The improvement described in claim 2, wherein:
    (a) said flanged leg portions of said retaining member are each formed with a dimple that engages the wall of the hub adjacent to the respective slot formed therein, thereby insuring that the retaining member will be secured, removably, on the hub.

6. The improvement described in claim 2, wherein:
    (a) the bearing comprises a ball bearing having an inner race secured to the arbor and an outer race received concentrically within the hub; and wherein:
    (b) said outer race of the bearing is retained by said respective flanged leg portions of said retaining member.

7. In a portable electric saw, the combination which comprises:
    (a) a hub formed as a relatively thin-walled cylindrical sleeve;
    (b) a ball bearing having an inner race and further having an outer race slidably received concentrically within said hub;
    (c) an arbor journaled in said inner race of said bearing;
    (d) a saw blade mounted on the end of said arbor;
    (e) an upper guard for said blade;
    (f) a guard bushing slidably fitted on said hub, said bushing having a flanged portion;
    (g) a lower blade guard rotatably mounted on said bushing, seated axially between said upper guard and said flanged portion of said bushing, and telescoping within said upper guard;
    (h) a pair of diametrically opposed slots formed in said hub; and
    (i) a bifurcated resilient retaining member having a pair of flanged leg portions received in said respective slots, thereby mounting said retaining member on said hub and resiliently retaining said guard bushing against axial movement off said hub;
    (j) said flanged leg portions of said retaining member projecting through said respective slots inwardly of said hub to retain said outer race of said bearing within said hub.

8. The combination of claim 7, wherein:
    (a) said upper guard is rotatably mounted on said hub; and wherein:
    (b) a spacer collar is received between said upper and lower guards;
    (c) said spacer collar having a flanged rim portion seated loosely in a trepan formed in the rearward face of said lower guard.

9. The combination of claim 8, wherein:
    (a) an annular shoulder is formed on said hub rearwardly of said rotatably mounted upper guard, whereby said resilient retaining member constantly urges said guard bushing, said spacer washer, and said upper guard against said shoulder.

10. In a power-driven machine, the combination of:
    (a) a hub comprising:
        (1) a cylindrical sleeve having a pair of diametrically-opposed slots formed therein; and
        (2) a flanged shoulder at one end of the sleeve, the shoulder having—
            (a) a first portion extending radially outwardly of the sleeve; and
            (b) a second portion extending radially inwardly of the sleeve;
    (b) a machine member seated externally upon the sleeve, coaxial therewith, and abutting against the first portion of the hub shoulder;
    (c) a bearing member seated internally within the sleeve, coaxial therewith, and abutting against the second portion of the hub shoulder;
    (d) an arbor shaft journaled within the bearing member and passing coaxially through the hub;
    (e) a tool element mounted on the shaft, externally of the hub; and
    (f) a retaining member mounted externally upon the sleeve, coaxial therewith and axially adjacent to the machine member, thereby maintaining the machine member against the first portion of the hub shoulder;
    (g) said retaining member having respective leg portions seated within the slots on the sleeve and projecting inwardly of the sleeve, axially adjacent to the bearing member, thereby retaining the bearing against the second portion of the hub shoulder;

(h) whereby the cylindrial sleeve may be made relatively thin-walled, thereby accommodating a relatively larger bearing member for a given sized arbor and for a given sized sleeve upon which the machine member is mounted.

11. The combination of claim 10, wherein:
(a) said retaining member comprises a split wavy washer, thereby exerting an axial bias for resiliently urging the machine member against the first portion of the hub shoulder; and wherein:
(b) said retaining member has means cooperating with the machine member for preventing a rotation of said retaining member about the axis of the hub sleeve.

12. In a power-driven tool, the combination of:
(a) a walled hub formed with a pair of shoulders;
(b) a bearing within the hub;
(c) an arbor journaled in the bearing;
(d) a tool element mounted on the arbor, externally of the hub;
(e) a guard for the tool element, the guard being mounted on the hub; and
(f) a retaining member mounted on the hub, retaining the guard against one of the shoulders formed on the hub;
(g) said retaining member having a portion extending through the hub, retaining the bearing against the other shoulder formed on the hub;
(h) whereby the hub may be made relatively thin-walled, thereby accommodating a relatively larger bearing for a given sized arbor on which the tool is mounted and for a given sized hub upon which the guard is mounted.

References Cited by the Examiner

UNITED STATES PATENTS

| 1,114,123 | 10/1914 | Dalton | 85—8.8 X |
| 1,513,710 | 10/1924 | Lewis. | |
| 2,952,281 | 9/1960 | Weber | 143—43 X |

FOREIGN PATENTS 902,667  12/1944  France.

DONALD R. SCHRAN, *Primary Examiner.*